United States Patent [19]

English

[11] 4,253,493
[45] Mar. 3, 1981

[54] ACTUATORS

[76] Inventor: Francis G. S. English, Grinstead, King James's La., Henfield, Sussex, England

[21] Appl. No.: 916,098

[22] Filed: Jun. 16, 1978

[30] Foreign Application Priority Data

Jun. 18, 1977 [GB] United Kingdom ............... 25563/77

[51] Int. Cl.³ ..................... F16K 31/08; H01F 7/16
[52] U.S. Cl. ..................... 137/625.18; 137/625.5; 137/625.65; 251/137; 335/234; 335/266; 335/268
[58] Field of Search ............ 137/625.5, 625.65, 625.18; 251/137; 335/234, 266, 268

[56] References Cited

U.S. PATENT DOCUMENTS

| 1,090,902 | 3/1914 | Beckwith | 251/137 |
| 3,202,886 | 8/1965 | Kramer | 335/268 X |
| 3,203,447 | 8/1965 | Bremner et al. | 137/625.65 X |
| 3,460,081 | 8/1969 | Tillman | 335/268 X |
| 3,728,654 | 4/1973 | Tada | 335/234 |
| 3,900,822 | 8/1975 | Hardwick et al. | 335/268 |

Primary Examiner—Gerald A. Michalsky
Attorney, Agent, or Firm—Morgan, Finnegan, Pine, Foley & Lee

[57] ABSTRACT

A bistable actuator comprising a magnetic member moveably mounted, in a housing of magnetic material, for movement between two positions. In each position such member is positively located adjacent a respective permanent magnet. Pole piece means is centrally located between the permanent magnets and extending from said housing to adjacent the moveably mounted member preferably extending to within a slot formed in the member. A separate coil is located within the housing between the pole piece means and each permanent magnet for energization to at least counteract the magnetic flux produced by the adjacent permanent magnet and allow movement of the member.

12 Claims, 8 Drawing Figures

ACTUATORS

The invention relates to actuators and to valves incorporating such actuators.

According to one aspect of the invention a bistable actuator comprises a magnetic member moveably mounted, in a housing of magnetic material, for movement between two positions, in each of which such member is positively located adjacent a respective permanent magnet, pole piece means centrally located between the permanent magnets and extending from said housing to adjacent the moveably mounted member and a separate coil located within the housing between the pole piece means and each permanent magnet for energisation to at least counteract the magnetic flux produced by the adjacent permanent magnet and allow movement of said member.

According to a further aspect of the invention a bistable actuator comprises a magnetic member moveably mounted, in a housing of magnetic material, for movement between two positions, in each of which such member is positively located adjacent a respective permanent magnet, pole piece means centrally located between the permanent magnets and extending from said housing to within a slot formed in the moveably mounted member and a separate coil located within the housing between the pole piece means and each permanent magnet for energisation to at least counteract the magnetic flux produced by the adjacent permanent magnet and allow movement of said member.

The actuator may be generally cylindrical and the permanent magnets may each comprise an axially magnetised ring magnet preferably formed by samarium cobalt. Each ring magnet may be located on a backing member of magnetic material which abuts the housing.

The permanent magnets may be arranged to have like poles facing towards the moveably mounted member, with both coils arranged to be energised in series or parallel to cause movement of the moveably mounted member.

Alternatively the permanent magnets may be arranged to have unlike poles facing towards the moveably mounted member with the coil adjacent the permanent magnet which is locating said member being energised to cause movement of said member.

Buffer means may be located on the moveably mounted member or on the pole piece means to ensure that such member is retained spaced from the permanent magnets.

The moveably mounted magnetic member may comprise or incorporate the flow control member of a fluid control valve.

A pair of fluid passages may enter the housing adjacent each permanent magnet, one such pair being closed by the moveably mounted member and the other pair being open to the interior of the housing for one position of the moveably mounted member and vice versa for the other such position of the moveably mounted member.

The moveably mounted member may comprise or include the spool of a spool and sleeve valve, the sleeve thereof comprising or including said pole piece means.

The moveably mounted member may comprise the control member of a poppet valve with the pole piece means including inlet/outlet ports of the valve.

The foregoing and further features of the invention may be more readily understood from the following description of some preferred embodiments thereof, by way of example, with reference to the accompanying drawings, in which:

FIG. 8 is a schematic representation of an actuator including return springs.

Figure 1:
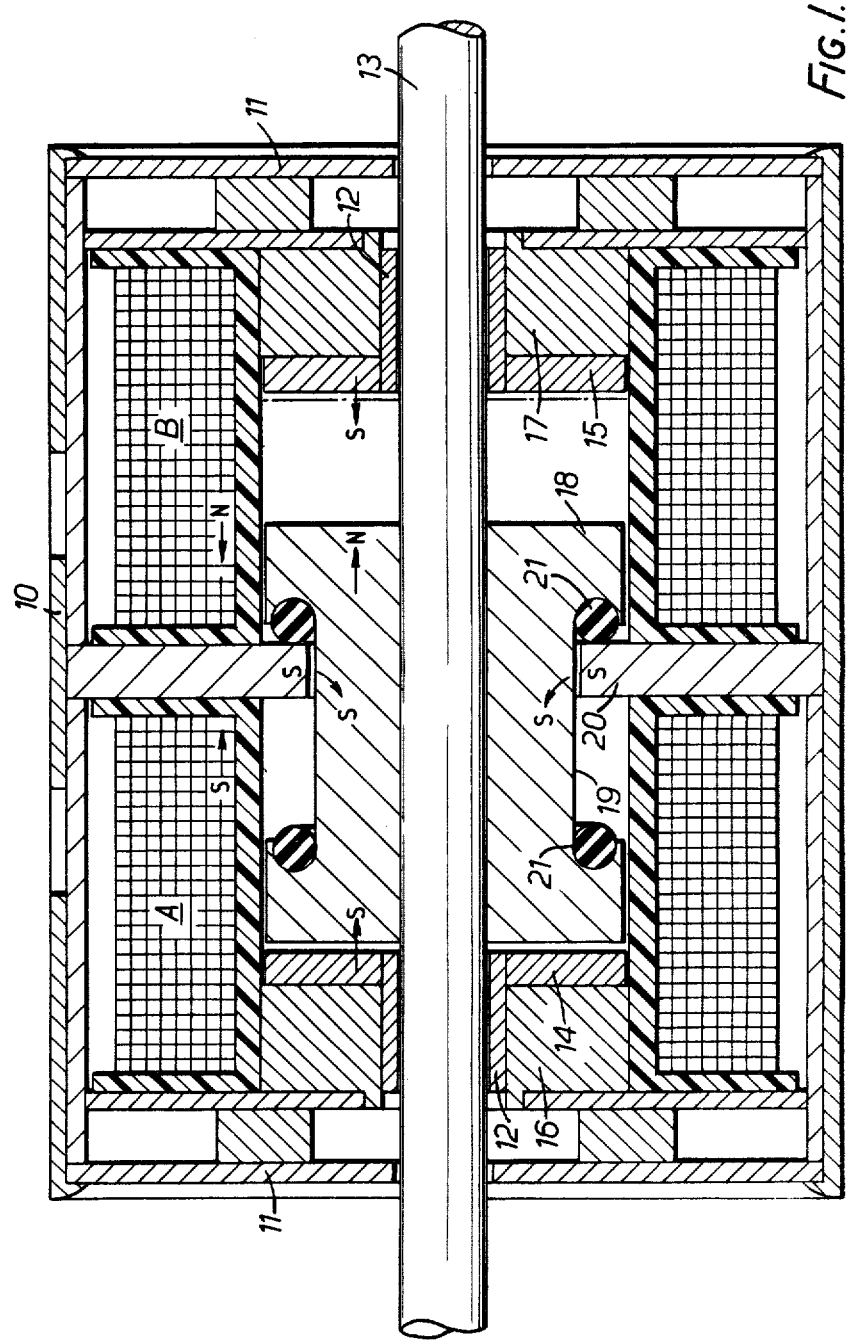
FIG. 1 is a side sectional view of a bistable actuator.

Referring firstly to FIG. 1 there is shown a bistable actuator comprising a cylindrical housing 10 of magnetic material with end closure members 11 of magnetic material housing bearings 12 mounting a shaft 13 of nonmagnetic material for longitudinal movement.

Axially magnetised ring magnets 14 and 15 of samarium cobalt are attached to respective backing members 16 and 17 of magnetic material which are located one abutting each end closure member 11.

A member of magnetic material or armature 18 is located on shaft 13 for movement between magnets 14 and 15. The armature 18 is formed with an annular slot 19 extending therealong and a pole piece 20 in the form of an apertured disc of magnetic material extends from housing 10 to within slot 19 with a minimum clearance therebetween. A resilient buffer ring 21 is located in slot 19 at each end thereof but these could alternatively be carried on pole piece 20. The buffer rings 21 ensure that the armature 18 does not engage the magnets 14 and 15 during operation.

A coil A is located between one member 11 and pole piece 20 to surround member 16, magnet 14 and part of armature 18. Similarly a coil B is located between the other end member 11 and pole piece 20 to surround member 17, magnet 15 and part of armature 18.

In this embodiment the permanent magnets 14 and 15 are arranged with like poles facing the armature 18. In use the armature 18 is retained in position adjacent magnet 14, as shown in FIG. 1, without the need for any energisation of coils A or B. When it is required to move armature 18 to its other position adjacent magnet 15, coils A and B are pulse energised in series or parallel so as to produce magnetic flux to oppose the permanent magnet flux of magnet 14 and to aid the flux of magnet 15. The armature then moves to the other position adjacent magnet 15 where it is retained until coils A and B are pulse energized with opposite polarity to return armature 18 to the position adjacent magnet 14. The shaft 13 is attached to a switch, valve or other device to be actuated by such actuator.

Figure 2:
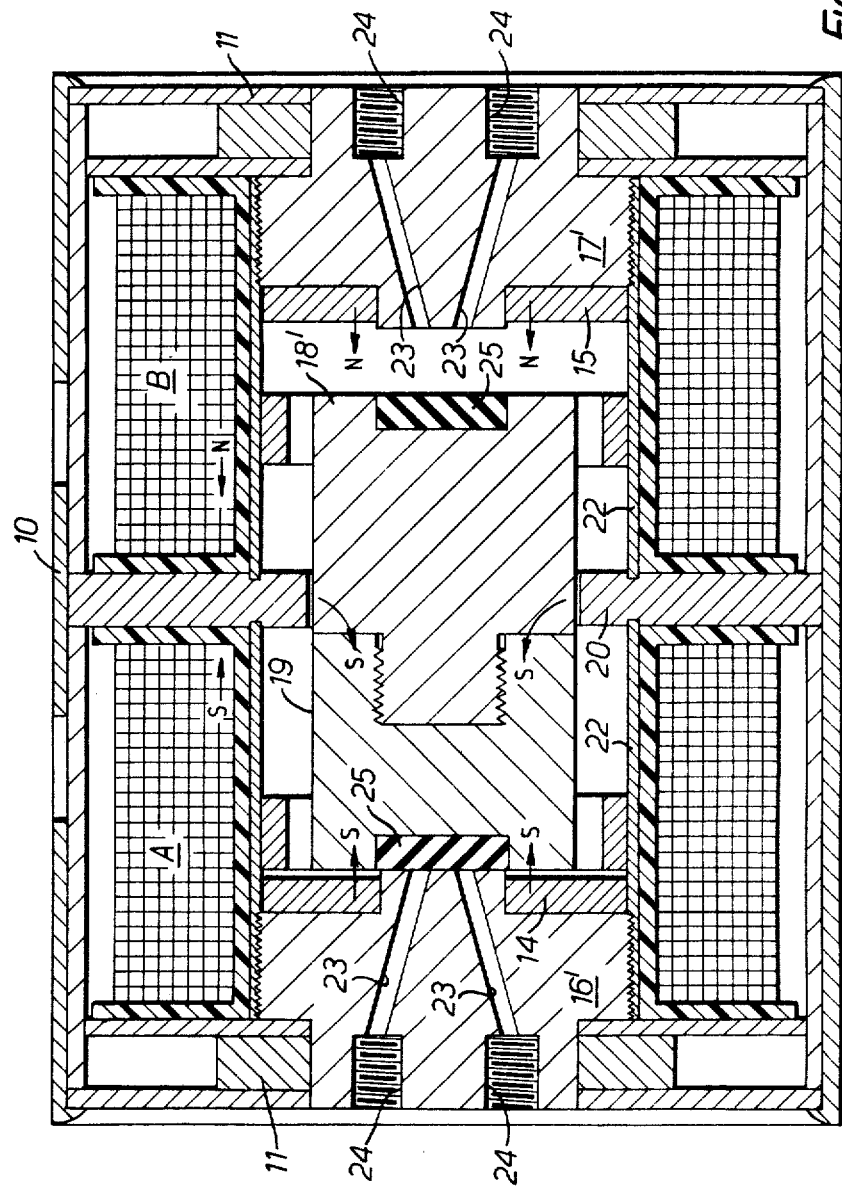
FIG. 2 is a side sectional view of a bistable pilot valve.

Referring now to FIG. 2 there is shown a similar device to that of FIG. 1 but in the form of a pilot valve. In this device shaft 13 is omitted and armature 18' is guided within cylindrical brass guides 22 extending between members 16' and 17' to pole piece 20.

Members 16' and 17' are formed with passages 23 leading to respective ports 24. The armature 18' carries buffer and sealing members 25 to buffer the action of the device and seal the passages 23 of whichever member 16' or 17' it is adjacent.

In this embodiment the magnets 14 and 15 are arranged with unlike poles facing armature 18. In operation, to move armature 18 from the position shown in FIG. 2 to abut member 17', the coil A is pulse energised so as to produce a magnetic flux to oppose the magnetic flux of magnet 14. The armature 18 then moves due to attraction of the magnetic flux of magnet 15. The armature 18 will remain in this position until coil B is energised to return armature 18 to the position shown in FIG. 2.

The FIG. 1 embodiment could be arranged to operate in the manner of FIG. 2 and vice versa.

Figure 3:
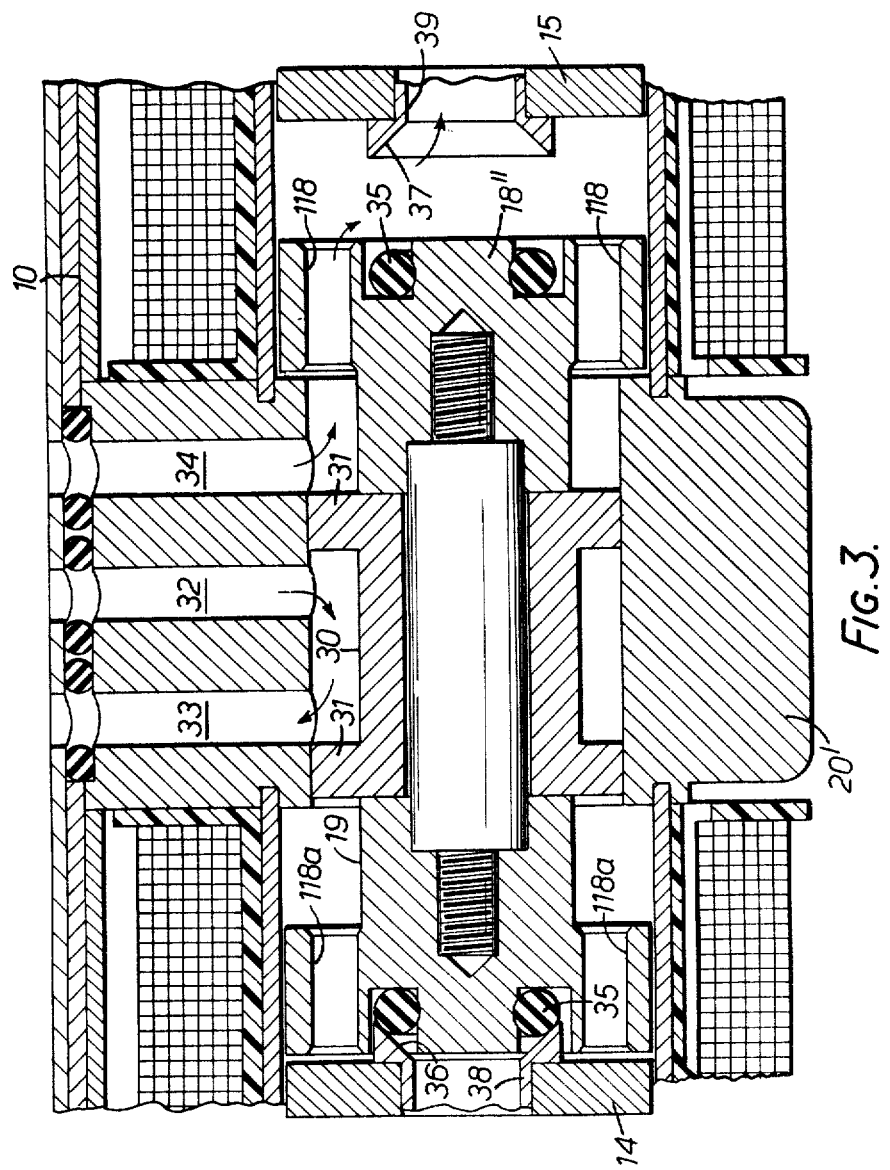
FIG. 3 is a side sectional view of a spool and sleeve valve.

Referring now to FIG. 3 there is shown a spool and sleeve valve which can be actuated in the manner described with reference to FIG. 1 or FIG. 2.

In this embodiment member 18" includes a spool 30 having lands 31 which control fluid flow between passages 32, 33 and 34 formed in pole piece 20'. Member 18" also carries an 'O' ring 35 at each end thereof for sealingly engaging with respective ports 36 and 37 of passages 38 and 39 formed in the housing to pass within respective magnets 14 and 15. With the member 18" in the position shown in the drawing fluid enters via passage 32 and exits via passage 33 whilst further fluid enters via passage 34 and exits via armature port 118 and passage 39, port 36 of passage 38 being closed by adjacent 'O' ring 35. In the other position of member 18" fluid entering passage 32 exits via passage 34, with port 37 of passage 39 closed, and fluid flow entering passage 33 exits via passage 38 via armature ports 118a.

Figure 4:
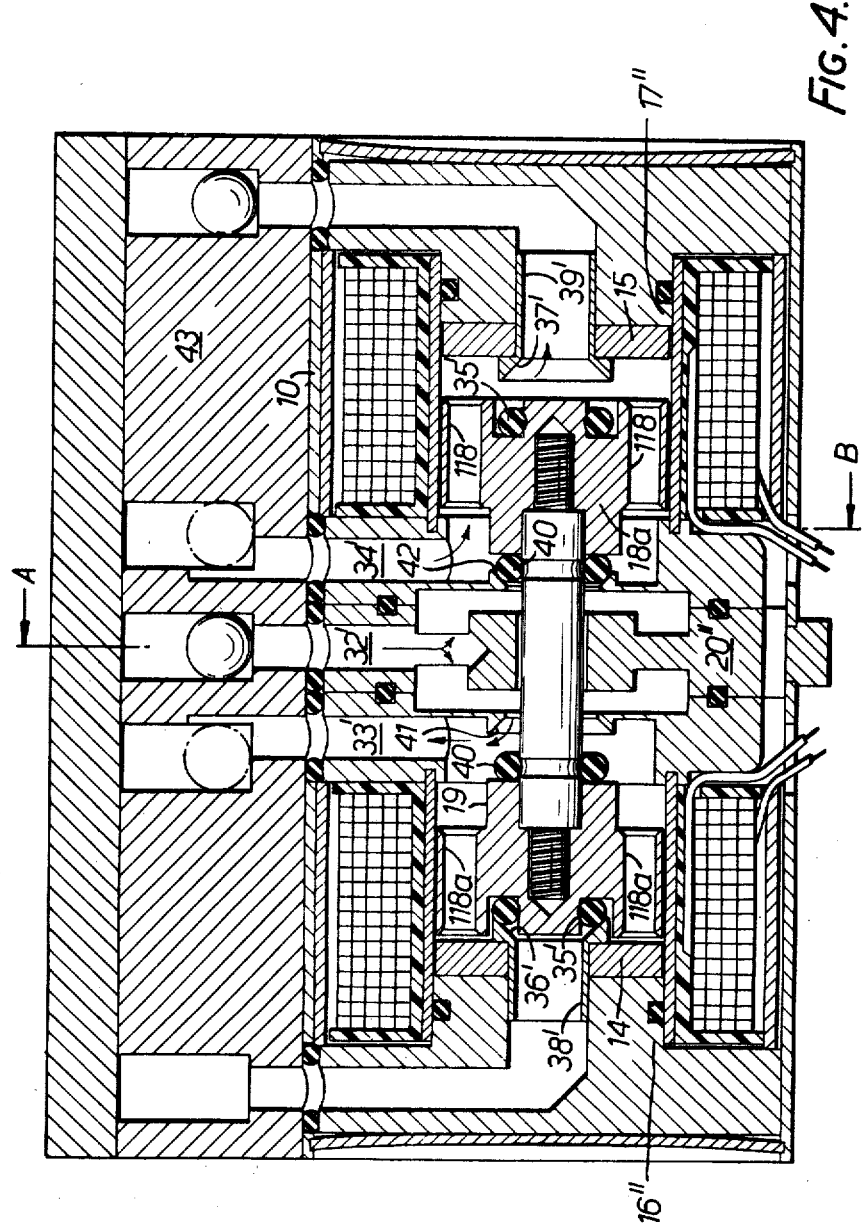
FIG. 4 is a side sectional view of a poppet valve.
Figure 5:
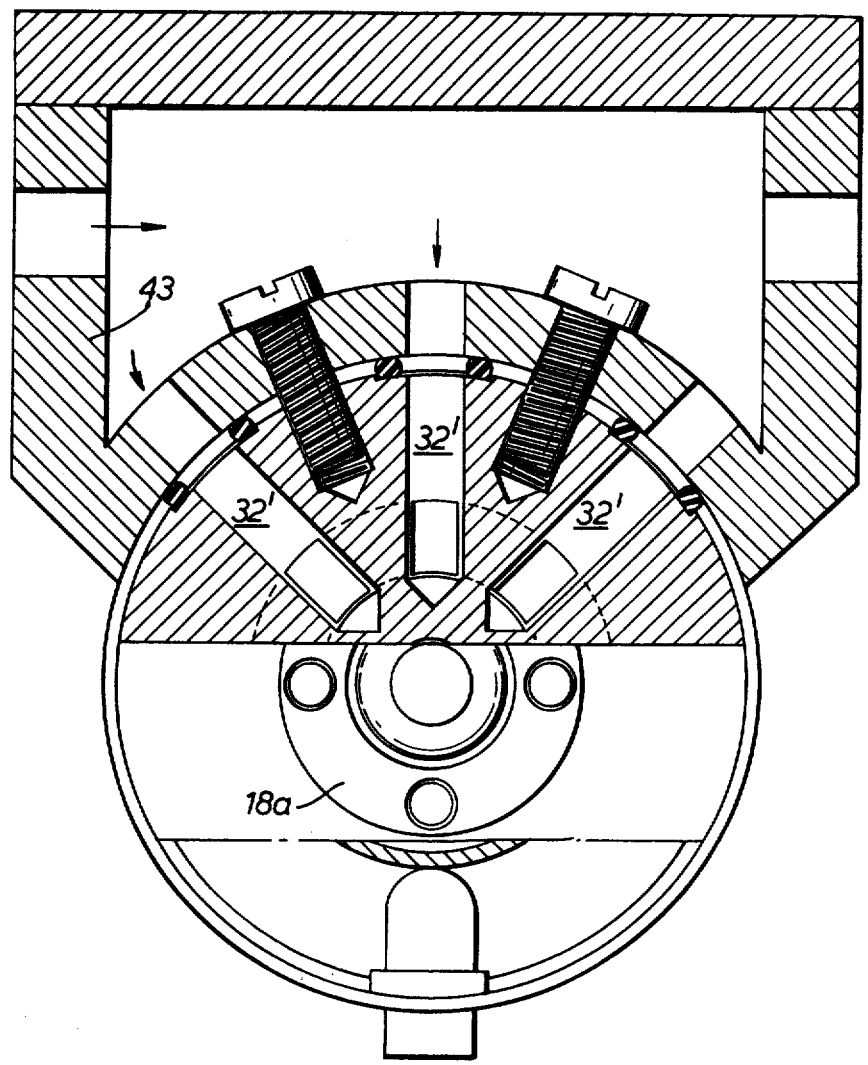
FIG. 5 shows part end sectional views at lines A and B respectively of FIG. 4.

Referring to FIGS. 4 and 5 there is shown a poppet valve which again can operate in either the manner of FIG. 1 or FIG. 2.

This valve is operated to provide the various fluid flows between passages 32', 33', 34', 38' and 39' as described for the FIG. 3 embodiment. However in this embodiment the spool is replaced by respective 'O' rings 40 carried on member 18a which close either port 41 or port 42 respectively connecting port 32' with port 33' and 34' and contained in pole piece 20". In this embodiment there is also shown a distribution member 43 for providing external connections to the fluid flow passages.

Figure 6:
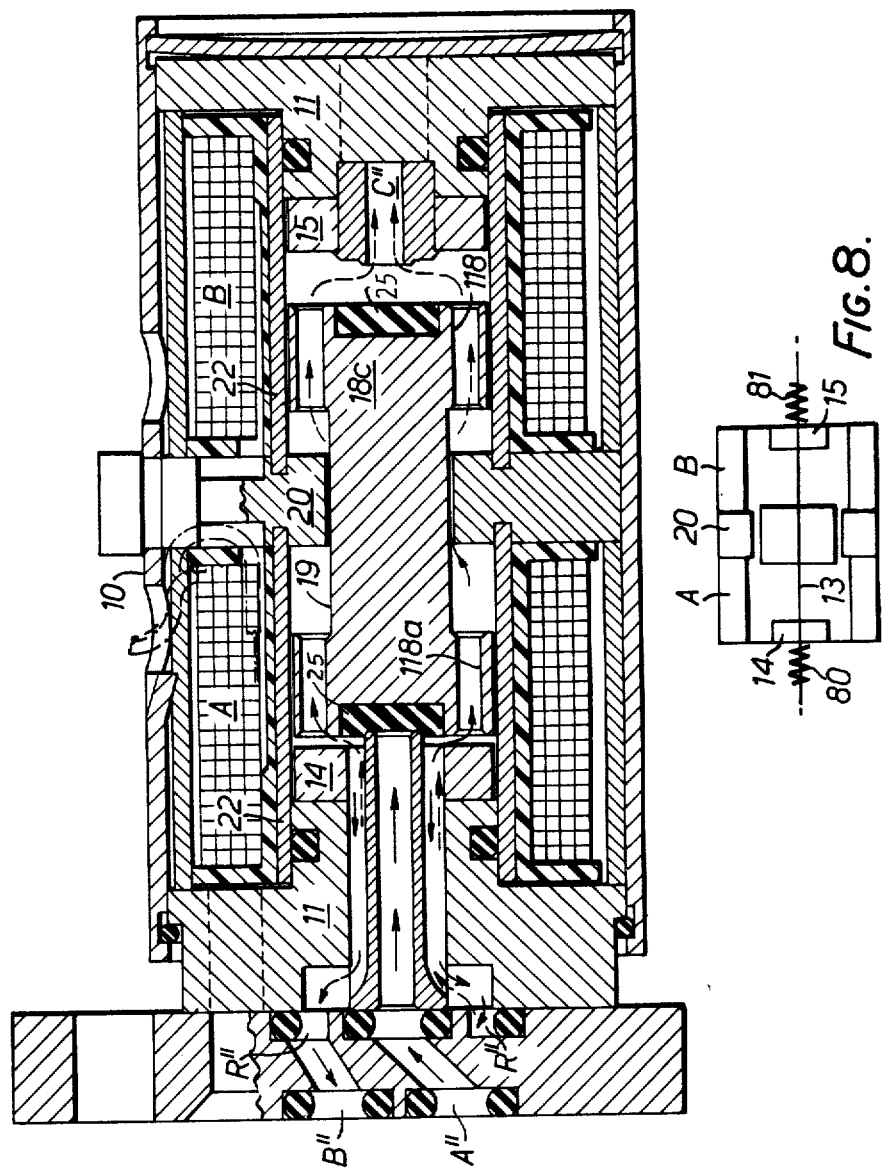
FIG. 6 is a side sectional view of an alternative bistable pilot valve.

Referring now to FIG. 6 there is shown an alternative form of pilot valve which can again operate in either the manner of FIG. 1 or FIG. 2.

In this embodiment there are two ports A" and B" adjacent magnet 14 and a single port C" adjacent magnet 15.

This valve can be connected to operate to give three different fluid flows:

(a) Port A" connected to pressure line. When the armature 18c is energised to move to the right, pressure is supplied to port B" via the four slots in the lining of the end cap and the annular recess R" as illustrated by the arrows. When the armature 18c is energised to move to the left then port A" is closed and the supply port B" is open to exhaust through port C".

(b) Port C" connected to the pressure line. When the armature 18c moves to the left port B" is open to port C" as illustrated by the dashed arrows and port A" is closed. When the armature 18c returns to the right the port A" acts as the exhaust.

(c) Port B" connected to the pressure line. With the armature 18c to the right there is a direct flow to port A".

Figure 7:
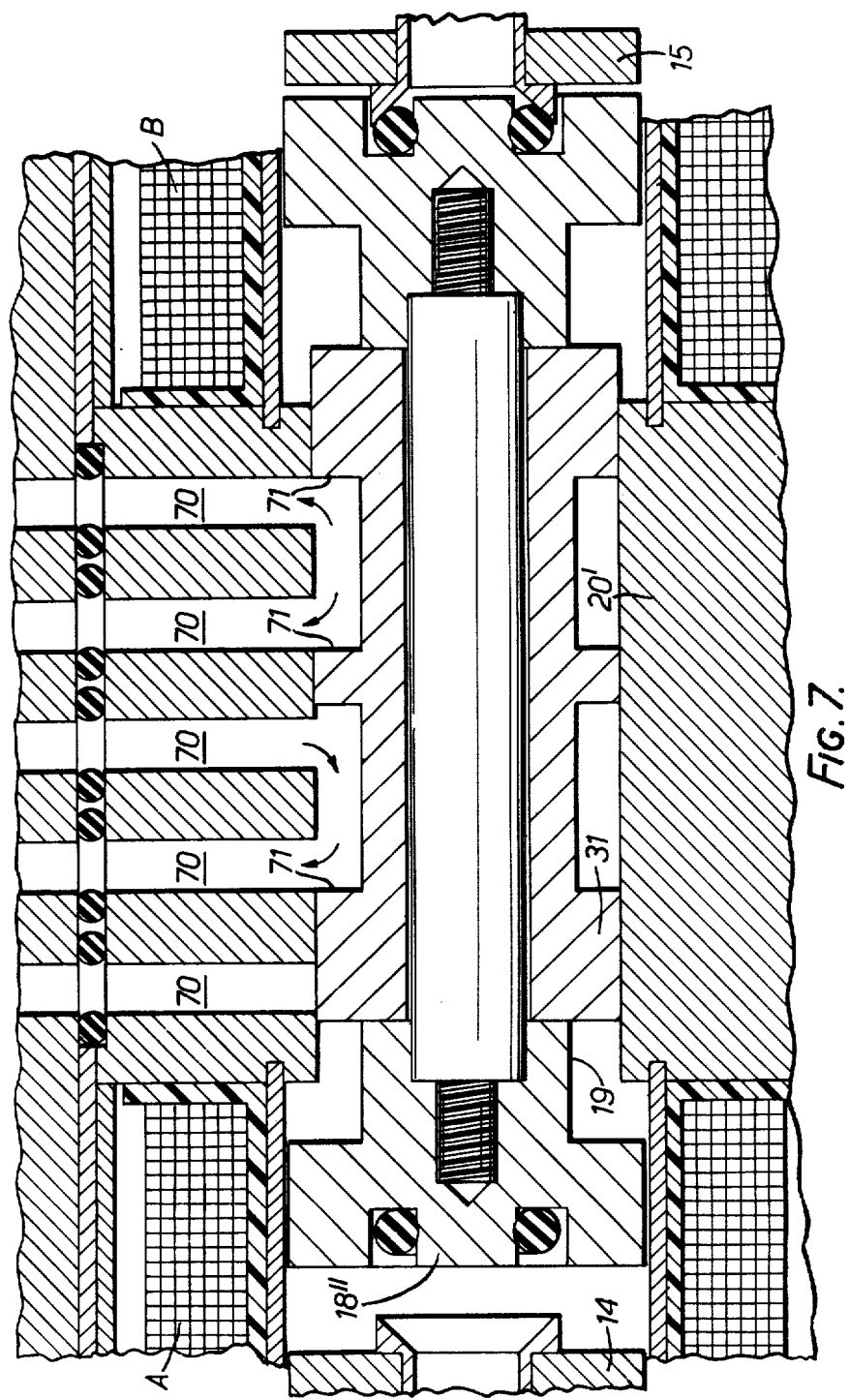
FIG. 7 is a side sectional view of an alternative spool and sleeve valve.

Referring now to FIG. 7 there is shown an alternative form of spool and sleeve valve which again can operate in either the manner of FIG. 1 or FIG. 2.

In this embodiment fluid flow is directed between pairs of the five ports 70 of sleeve 20' under control of the three lands 71 on spool 18" in known manner.

Referring now to FIG. 8 there is shown schematically an actuator similar to that of FIG. 1 except that springs 80 and 81 are included to act on shaft 13. The arrangement is such that the magnetic flux produced by magnet 14 and coil A is greater than the force of spring 80 and the magnetic flux produced by magnet 15 and coil B is greater than the force of spring 81. When the current is reversed in coil A or B the armature is urged towards the central position by spring 80 or 81 respectively. Such an arrangement could be used with any of the previously described embodiments.

I claim:

1. A bistable actuator of generally cylindrical shape comprising a magnetic member moveably mounted, in a housing of magnetic material, for movement between two positions, in each of which such member is positively located adjacent a respective permanent axially magnetized ring magnet of samarian cobalt, pole piece means centrally located between the permanent magnets and extending from said housing to within a slot formed in the moveably mounted member and a separate coil located within the housing between the pole piece means and each permanent magnet for energisation to at least counteract the magnetic flux produced by the adjacent permanent magnet and allow movement of said member.

2. A bistable actuator as claimed in claim 1 wherein each ring magnet is located on a backing member of magnetic material which abuts the housing.

3. A bistable actuator as claimed in claim 1 wherein the permanent magnets are arranged to have like poles facing towards the moveably mounted member, with both coils arranged to be energised in series or parallel to cause movement of the moveably mounted member.

4. A bistable actuator as claimed in claim 1 wherein the permanent magnets are arranged to have unlike poles facing towards the moveably mounted member with the coil adjacent the permanent magnet which is locating said member being energised to cause movement of said member.

5. A bistable actuator as claimed in claim 1 wherein buffer means is located on the moveably mounted member to ensure that such member is retained spaced from the permanent magnets.

6. A bistable actuator as claimed in claim 1 wherein the moveably mounted member is connected to a flow control member of a fluid control valve.

7. A bistable actuator as claimed in claim 6 wherein a pair of fluid passages enter the housing adjacent each permanent magnet, one such pair being closed by the moveably mounted member and the other pair being open to the interior of the housing for one position of the moveably mounted member and vice versa for the other such position of the moveably mounted member.

8. A bistable actuator as claimed in claim 6 wherein a pair of fluid passages enter the housing adjacent one of the permanent magnets and a single fluid passage enters the housing adjacent the other permanent magnet.

9. A bistable actuator as claimed in claim 6 wherein the moveably mounted member comprises the control member of a poppet valve with the pole piece means including inlet/outlet ports of the valve.

10. A bistable actuator as claimed in claim 1 wherein the moveably mounted member comprises or includes the spool of a spool and sleeve valve, the sleeve thereof comprising said pole piece means.

11. A bistable actuator as claimed in claim 10 wherein said sleeve includes five fluid inlet/outlet ports and said spool is formed with three lands.

12. A bistable actuator as claimed in claim 1 wherein a spring is arranged to cooperate with the moveably mounted member in at least one of its positively located positions.

* * * * *